(No Model.)
J. BROOKS.
CLUTCH.
No. 413,490. Patented Oct. 22, 1889.
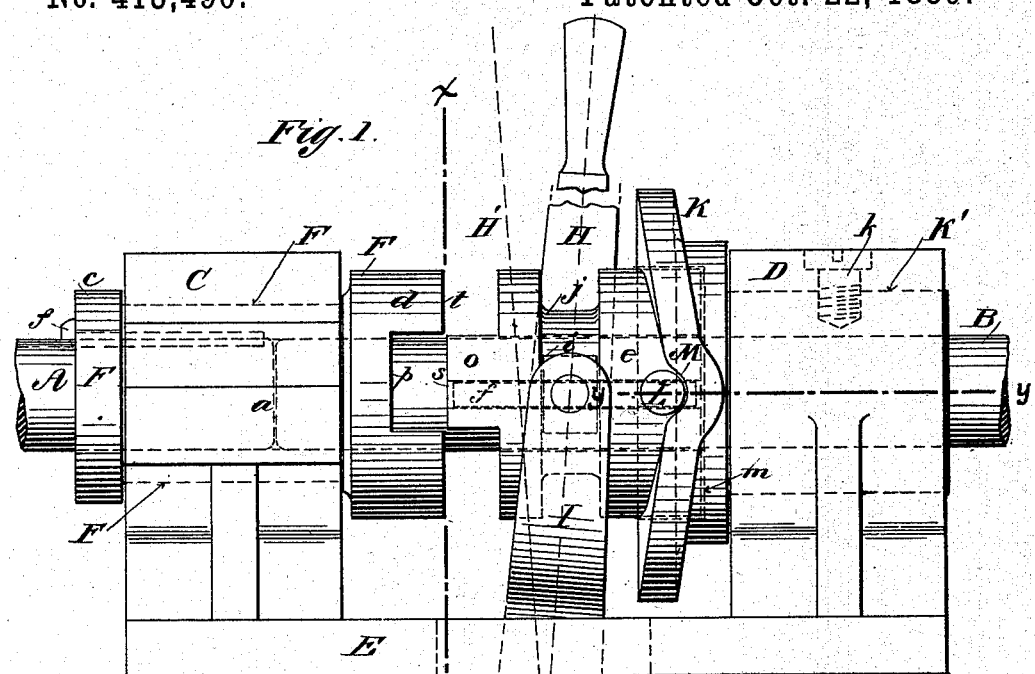
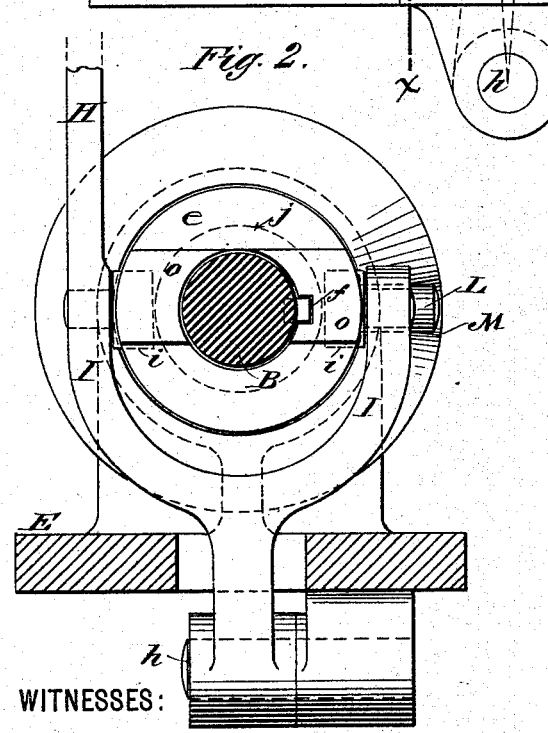
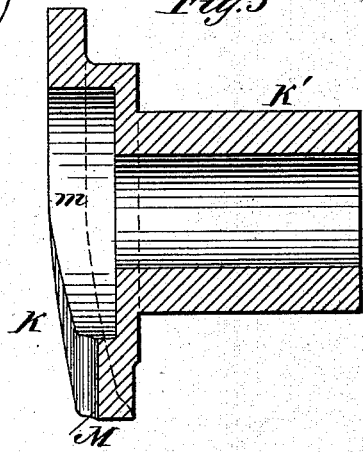
WITNESSES:
J. Cook
J H Murphy
INVENTOR
John Brooks
BY
Chas N Forbes
ATTORNEY

UNITED STATES PATENT OFFICE.

JOHN BROOKS, OF PLAINFIELD, NEW JERSEY.

CLUTCH.

SPECIFICATION forming part of Letters Patent No. 413,490, dated October 22, 1889.

Application filed March 16, 1889. Serial No. 303,594. (No model.)

*To all whom it may concern:*

Be it known that I, JOHN BROOKS, a citizen of the United States, residing at Plainfield, county of Union, State of New Jersey, have invented a certain new and useful Improvement in Clutches, of which the following is a specification.

My invention relates to clutches having interlocking teeth that are adapted to engage at a single point of revolution to transmit rotation from a driving-shaft to a driven shaft, and the said invention is applicable to machinery generally.

My invention consists of a novel device whereby the driven shaft is arrested at a given point of revolution when disengaged from the driving-shaft by the shifting of the clutch, and I will proceed to describe the details of construction of a clutch embodying the features of my invention, reference being had to the accompanying drawings, in which—

Figure 1 is a side elevation; Fig. 2, a transverse section of Fig. 1 on the line $x\ x$; and Fig. 3, a detail view of the novel part of the mechanism, being taken in section in a plane corresponding with the line $y\ y$, Fig. 1.

A is the driving-shaft, terminating at the point $a$, and B the driven shaft, terminating adjacent the end of the driving-shaft A, being in axial line therewith. The shafts A and B have bearings in the boxes C D, connected by a base E or other frame-work.

F is a sleeve fixed to the shaft A by means of a key $f$ or other mode of attachment, the sleeve F revolving with the shaft A in the box C. The shaft A extends but partly through the sleeve F, the remaining portion of the latter affording a bearing for the end of the shaft B inserted to turn loosely therein. The portion $d$ of the sleeve F opposite the inner face of the bearing C is enlarged to form a clutch-disk, the same being retained against longitudinal movement by the shoulder or collar $c$ at the opposite end thereof outside the bearing C.

The clutch-disk $e$, opposite the disk $d$, which is shown in a disengaged position, rotates with the shaft B, and is movable longitudinally upon the feather $f$ thereon, corresponding to the usual organization of an interlocking clutch. The disk $e$ is shifted by any suitable mechanical device—such as that illustrated—consisting of a hand-lever H, connected to or forming a part of a yoke I, fulcrumed at $h$, which bears studs or pivoted blocks $i$, fitting into the groove $j$ upon the disk. The rib and socket $o$ and $p$ of the opposite clutch-disks are adapted to interlock at a given point of rotation, and to this purpose are located to traverse the disks aside from their center, the same corresponding to the clutch described in my application for a patent, filed March 24, 1888, Serial No. 268,354.

The novel device herein is, however, applicable to any form of interlocking clutch wherein the engagement occurs at a single point of rotation.

K is a stationary cam fixed in the box D, being extended therein in the form of a bushing K', that is secured by the set-screw $k$ in the box, so as to form a bearing in which the shaft B turns. I employ this as the most convenient means of securing the cam K in a fixed position, the same, however, being capable of support in any other suitable manner. The construction shown admits of an adjustment of the cam K about the shaft B to any desired point, rendering the period of arrest of the driven shaft variable according to such adjustment, there being successive holes provided in the bushing K', circumferentially thereto, for the insertion of the screw $k$ at different points.

The cam K (shown in section in Fig. 3) has a socket or hollowed center $m$ within its face, which admits the back or butt of the clutch-disk $e$, so that the circumferential surface of the latter, when the clutch is disengaged, shall lie adjacent the inner margins of all parts of the cam-surface. There is a pin or stud L projecting laterally from the said circumferential surface, and there is also a depression M in the face of the cam K, into which the stud L is received when the clutch is disengaged. The surface of the cam K at that portion lying opposite the said depression is flat, say, at half its circumference, and occupies a position whereby the stud L will pass over it in rotation when the clutch is closed. The remaining surface of the cam K retires on an incline toward the depression M at either side thereof. The retirement of the depression M from the plane of the flat or prominent portion of the cam is equal in distance to the full shifting stroke of the disk e, so that when the stud L is in the depression the surface s of the rib o is proximate to the plane of the surface t of the opposite disk, and the clutch-disk e therefore cannot rotate from its position of stoppage, except by a positive interlocking movement of the clutch-disks at a given point of rotation, as hereinbefore described.

In operation, the clutch being closed and the lever H occupying a position indicated by the angle of the dotted line H', revolution is imparted from the shaft A to the shaft B. It being desired to disengage the clutch, the operator applies force to shift the lever from the position indicated by H' to the position H, such movement, however, being opposed should the pin L be impinging in its rotation upon the prominent portion of the cam K, the passage of the pin upon the receding surface of the cam permitting said movement to begin. The rib o of the clutch passes outward from the socket p as the pin approaches and enters the final depression, disengaging and arresting the shaft B simultaneously.

I claim as my invention—

1. The combination of a driving and a driven shaft, interlocking clutch-disks, the one rotatable and the other rotatable and longitudinally movable upon the respective shafts, a stationary cam concentric with the axis of the clutch, the face whereof is presented in a direction opposite to that of the release movement of the movable disk, said cam provided with a prominent portion and a depression M, and said movable disk provided with a projection, as the stud L, rotative in a path opposite and adjacent the cam, capable of entrance into the said depression, whereby the clutch is released at a given point.

2. The combination of a driving and a driven shaft, interlocking clutch-disks capable of engagement at a single point of rotation, one of said disks being rotatable and the other rotatable and longitudinally movable upon the respective shafts, a projection, as the stud L, upon the movable disk, a stationary cam concentric with the axis of the clutch, having a prominent portion and a depressed portion opposite said projection, said stationary cam being rotatively adjustable, for the purpose specified.

3. The combination, with the driving and driven shafts, and interlocking clutch-disks arranged substantially as specified, the longitudinally-movable member of which bears a projection, of a stationary cam opposite said projection, concentric with the axis of the clutch, having a prominent portion and a depressed portion, and provided with a shank or bushing entering the adjacent shaft-bearing, and a locking device, such as the set-screw k, for the purpose specified.

JOHN BROOKS.

Witnesses:
H. F. PARKER,
C. W. FORBES.